(12) United States Patent
Selvam et al.

(10) Patent No.: US 11,959,249 B2
(45) Date of Patent: Apr. 16, 2024

(54) SYSTEM AND METHOD FOR AUTOMATIC TILTING OF OPERATOR CABIN

(71) Applicant: Caterpillar Global Mining Equipment LLC, Denison, TX (US)

(72) Inventors: Sudhagar Selvam, Chennai (IN); Saravanan Mathivanan, Chennai (IN)

(73) Assignee: Caterpillar Global Mining Equipment LLC, Denison, TX (US)

( * ) Notice: Subject to any disclaimer, the term of this patent is extended or adjusted under 35 U.S.C. 154(b) by 129 days.

(21) Appl. No.: 17/474,184

(22) Filed: Sep. 14, 2021

(65) Prior Publication Data

US 2023/0078475 A1  Mar. 16, 2023

(51) Int. Cl.
| | | |
|---|---|---|
| *E02F 9/16* | (2006.01) | |
| *B62D 33/06* | (2006.01) | |
| *B62D 33/067* | (2006.01) | |
| *B62D 33/07* | (2006.01) | |
| *B62D 33/073* | (2006.01) | |

(52) U.S. Cl.
CPC ............ *E02F 9/166* (2013.01); *B62D 33/067* (2013.01); *B62D 33/073* (2013.01)

(58) Field of Classification Search
CPC ..... E02F 9/166; B62D 33/067; B62D 33/063; B62D 33/07
See application file for complete search history.

(56) References Cited

U.S. PATENT DOCUMENTS

| | | | |
|---|---|---|---|
| 6,029,764 A | 2/2000 | Schubert | |
| 6,273,203 B1 | 8/2001 | Paggi et al. | |
| 8,180,532 B2 | 5/2012 | O'Halloran et al. | |
| 9,238,902 B2* | 1/2016 | Meinders | ................ E02F 9/166 |
| 9,630,660 B2 | 4/2017 | Hellholm | |
| 11,584,456 B2* | 2/2023 | Selvam | ................... E21B 7/024 |
| 2006/0182594 A1* | 8/2006 | Wager | ..................... E02F 9/166 |
| | | | 414/691 |
| 2009/0118913 A1* | 5/2009 | O'Halloran | ............. E02F 9/028 |
| | | | 701/50 |
| 2009/0250971 A1* | 10/2009 | Breitenfeldt | .......... E02F 9/0833 |
| | | | 296/190.04 |

(Continued)

FOREIGN PATENT DOCUMENTS

| | | |
|---|---|---|
| JP | 10046628 | 2/1998 |
| JP | 3062364 | 7/2000 |

(Continued)

*Primary Examiner* — Barry Gooden, Jr.

(57) ABSTRACT

A system for automatic tilting of an operator cabin of a work machine includes a first sensor that generates a first signal indicative of a first pitch angle of a frame structure relative to a non-inclined surface. The system also includes a tilting mechanism to tilt the operator cabin relative to the frame structure. The system further includes a controller that receives the first signal indicative of the first pitch angle. The controller determines a second pitch angle based on the first pitch angle. The controller controls first and second actuators to tilt the operator cabin by the second pitch angle relative to the non-inclined surface. The second pitch angle is opposite in direction to the first pitch angle. Further, based on a tilting of the operator cabin, a plane defined by the operator cabin is substantially parallel to the non-inclined surface.

19 Claims, 9 Drawing Sheets

(56) References Cited

U.S. PATENT DOCUMENTS

| | | | | |
|---|---|---|---|---|
| 2009/0314566 A1* | 12/2009 | Rust | ............... | E02F 9/028 |
| | | | | 701/49 |
| 2021/0024148 A1* | 1/2021 | Selvam | ............... | B62D 55/116 |
| 2021/0164195 A1* | 6/2021 | Mathivanan | ............ | E02F 9/166 |

FOREIGN PATENT DOCUMENTS

| | | | | | |
|---|---|---|---|---|---|
| JP | 2003184127 A | * | 7/2003 | ............. | E02F 9/166 |
| JP | 2006009463 A | * | 1/2006 | ............. | E02F 9/166 |
| JP | 4967333 | | 7/2012 | | |
| WO | 89/00928 | | 2/1989 | | |

* cited by examiner

SYSTEM AND METHOD FOR AUTOMATIC TILTING OF OPERATOR CABIN

TECHNICAL FIELD

The present disclosure relates to a system and a method for automatic tilting of an operator cabin of a work machine.

BACKGROUND

Work machines, such as boom mounted drilling machines, surface drilling machines, rotary blasthole type drilling machines, and the like, may be used to perform drilling operations. Such work machines include a drilling assembly coupled to a frame of the work machine by a boom member. Further, an operator of the work machine may be seated within an operator cabin of the work machine when the drilling operation is in progress. In some situations, the work machine may be required to perform the drilling operation on a slope. During the drilling operation, it may be desirable that the operator is seated within the operator cabin in an upright position to ensure operator comfort. Moreover, it may be desirable for the operator to view the ongoing drilling operations while being seated within the operator cabin.

When the machine is located on the slope, the operator present within the operator cabin may not be seated in the upright position. Further, if the drilling operation continues for a longer time, the operator may experience discomfort. Moreover, the operator may not be able to view the ongoing drilling operation, or the operator may have to stand at intervals to view the drilling operation, which may cause operator fatigue. The above mentioned challenges may affect an efficiency of the drilling operation and may also affect operator comfort. Thus, it may be desirable to develop a system and a method that addresses the abovementioned challenges.

JP3062364B2 describes an oscillating cabin for a working vehicle. The working vehicle maintaining an operator seat almost horizontal by oscillating the cabin longitudinally to the forward tilting and the rearward tilting of a machine body while travelling. In this case, for speed reduction, solenoid valves are provided to the hydraulic circuits of hydraulic actuators to oscillate the cabin longitudinally. Further, an operation speed near the upper limit position and the lower limit position of the hydraulic actuators in the horizontal position, an elevating time, and a lowering time is reduced automatically in cooperation with reduction valve devices. Thus, the oscillation speed of the cabin in the longitudinal direction is reduced. Moreover, the deterioration of a riding amenity resulting from transmitting the pulsation of the hydraulic pressure to the cabin is suppressed, and as a result, the cabin is oscillated to the object position in a short time.

SUMMARY OF THE DISCLOSURE

In one aspect of the present disclosure, a system for automatic tilting of an operator cabin of a work machine is provided. The work machine includes a frame structure. The system includes at least one first sensor coupled to the work machine. The at least one first sensor is configured to generate a first signal indicative of a first pitch angle of the work machine relative to a non-inclined surface. The system also includes a tilting mechanism adapted to tilt the operator cabin relative to the frame structure. The tilting mechanism includes a mounting structure fixedly coupled with the operator cabin. The tilting mechanism also includes a first actuator defining a first end and a second end. The first end of the first actuator is movably coupled to the frame structure and the second end of the first actuator is movably coupled to the mounting structure. The tilting mechanism further includes a second actuator defining a third end and a fourth end. The third end of the second actuator is movably coupled to the frame structure and the fourth end of the second actuator is movably coupled to the mounting structure. The system further includes a controller communicably coupled to the at least one first sensor, the first actuator, and the second actuator. The controller is configured to receive the first signal indicative of the first pitch angle of the work machine. The controller is also configured to determine a second pitch angle based on the first pitch angle. The controller is further configured to control at least one of the first and second actuators to tilt the operator cabin by the second pitch angle relative to the non-inclined surface. The second pitch angle is opposite in direction to the first pitch angle. Based on a tilting of the operator cabin relative to the frame structure, a plane defined by the operator cabin is substantially parallel to the non-inclined surface.

In another aspect of the present disclosure, a method for automatic tilting of an operator cabin of a work machine is provided. The work machine includes a frame structure. The method includes generating, by at least one first sensor coupled to the work machine, a first signal indicative of a first pitch angle of the work machine relative to a non-inclined surface. The method also includes receiving, by a controller of the work machine, the first signal indicative of the first pitch angle of the work machine. The method further includes determining, by the controller, a second pitch angle based on the first pitch angle. The method includes controlling at least one of a first actuator of the work machine and a second actuator of the work machine to tilt the operator cabin by the second pitch angle relative to the non-inclined surface. The first actuator defines a first end and a second end. The first end of the first actuator is movably coupled to the frame structure and the second end of the first actuator is movably coupled to a mounting structure of the work machine. The second actuator defines a third end and a fourth end. The third end of the second actuator is movably coupled to the frame structure and the fourth end of the second actuator is movably coupled to the mounting structure. The second pitch angle is opposite indirection to the first pitch angle. Based on a tilting of the operator cabin relative to the frame structure, a plane defined by the operator cabin is substantially parallel to the non-inclined surface.

In yet another aspect of the present disclosure, a work machine is provided. The work machine includes a frame structure. The work machine also includes an operator cabin movably coupled to the frame structure. The work machine further includes a system for automatic tilting of the operator cabin. The system includes at least one first sensor coupled to the work machine. The at least one first sensor is configured to generate a first signal indicative of a first pitch angle of the work machine relative to a non-inclined surface. The system also includes a tilting mechanism for tilting the operator cabin relative to the frame structure. The tilting mechanism includes a mounting structure fixedly coupled with the operator cabin. The tilting mechanism also includes a first actuator defining a first end and a second end. The first end of the first actuator is movably coupled to the frame structure and the second end of the first actuator is movably coupled to the mounting structure. The tilting mechanism further includes a second actuator defining a third end and a fourth end. The third end of the second actuator is movably coupled to the frame structure and the fourth end of the second actuator is movably coupled to the mounting structure. The system further includes a controller communicably coupled to the at least one first sensor, the first actuator, and the second actuator. The controller is configured to receive the first signal indicative of the first pitch angle of the work machine. The controller is also configured to determine a second pitch angle based on the first pitch angle. The controller is further configured to control at least one of the first and second actuators to tilt the operator cabin by the second pitch angle relative to the non-inclined surface. The second pitch angle is opposite in direction to the first pitch angle. Based on a tilting of the operator cabin relative to the frame structure, a plane defined by the operator cabin is substantially parallel to the non-inclined surface.

Other features and aspects of this disclosure will be apparent from the following description and the accompanying drawings.

DETAILED DESCRIPTION

Wherever possible, the same reference numbers will be used throughout the drawings to refer to the same or the like parts. Wherever possible, corresponding or similar reference numbers will be used throughout the drawings to refer to the same or corresponding parts.

Figure 1:
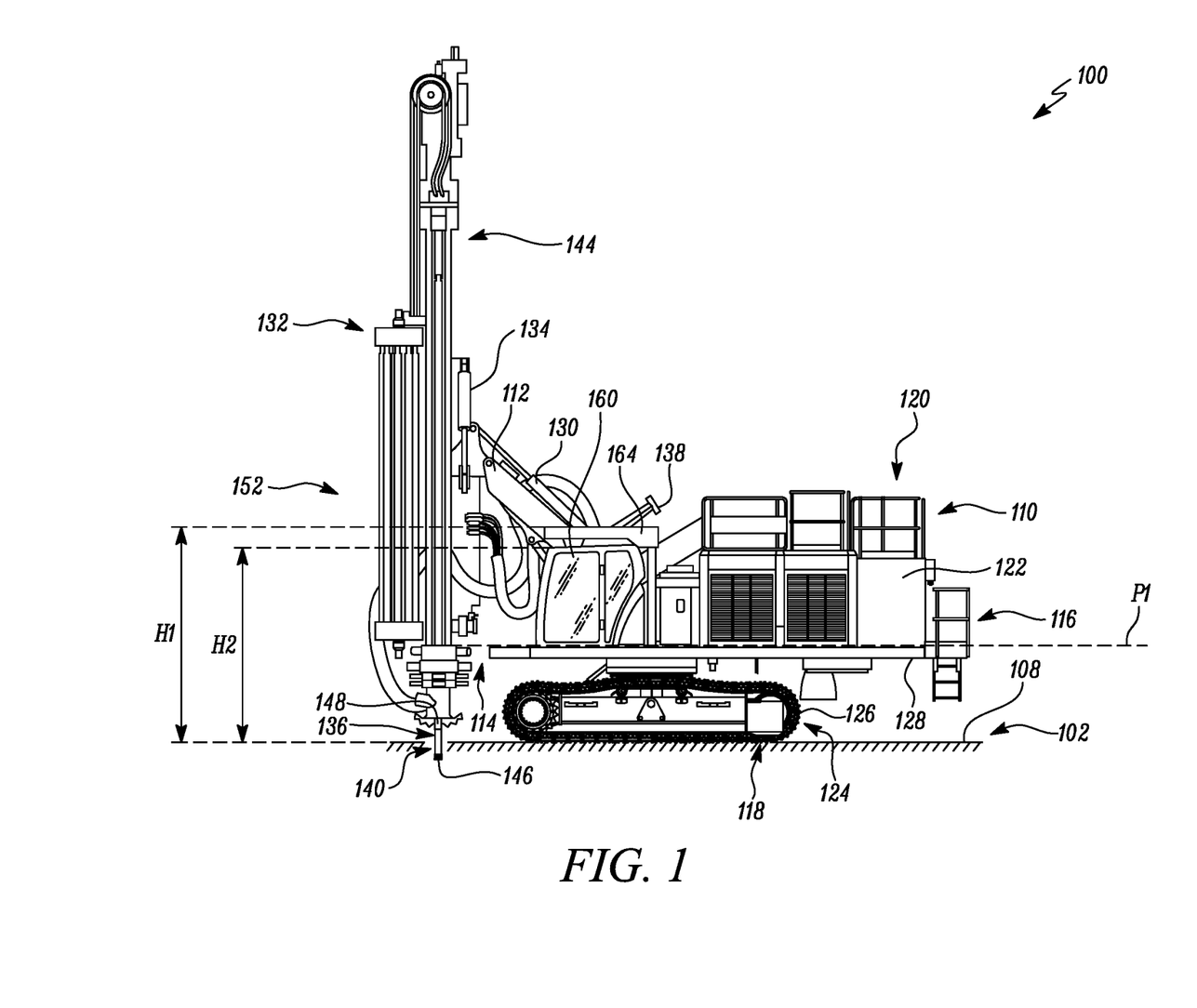
FIG. 1 illustrates a side view of a work machine, according to examples of the present disclosure.

FIG. 1 illustrates a side view of an exemplary work machine 100. The work machine 100 is embodied as a drilling machine herein. Specifically, the work machine 100 is embodied as a boom mounted drilling machine herein. Although shown as the boom mounted drilling machine, it may be understood that the work machine 100 may alternatively include other machines, such as a surface drilling machine, a rotary blasthole type drilling machine, and so on, based on application requirements.

The work machine 100 may perform various drilling related operations, such as sub-surface mineral extraction, mineral exploration, environmental exploration, hydraulic fracturing, oil, gas, and/or water extraction wells, rock cut drilling for mining and/or quarrying operations, and the like. It should be noted that the type of work machine 100 does not limit the scope of the present disclosure. The work machine 100 operates on a ground surface 102. The ground surface 102 may include a number of uneven surfaces or undulations, such as, bumps, depressions, one or more uphill slopes 104 (shown in FIG. 4), one or more downhill slopes 106 (shown in FIG. 6), and the like.

Figure 4:
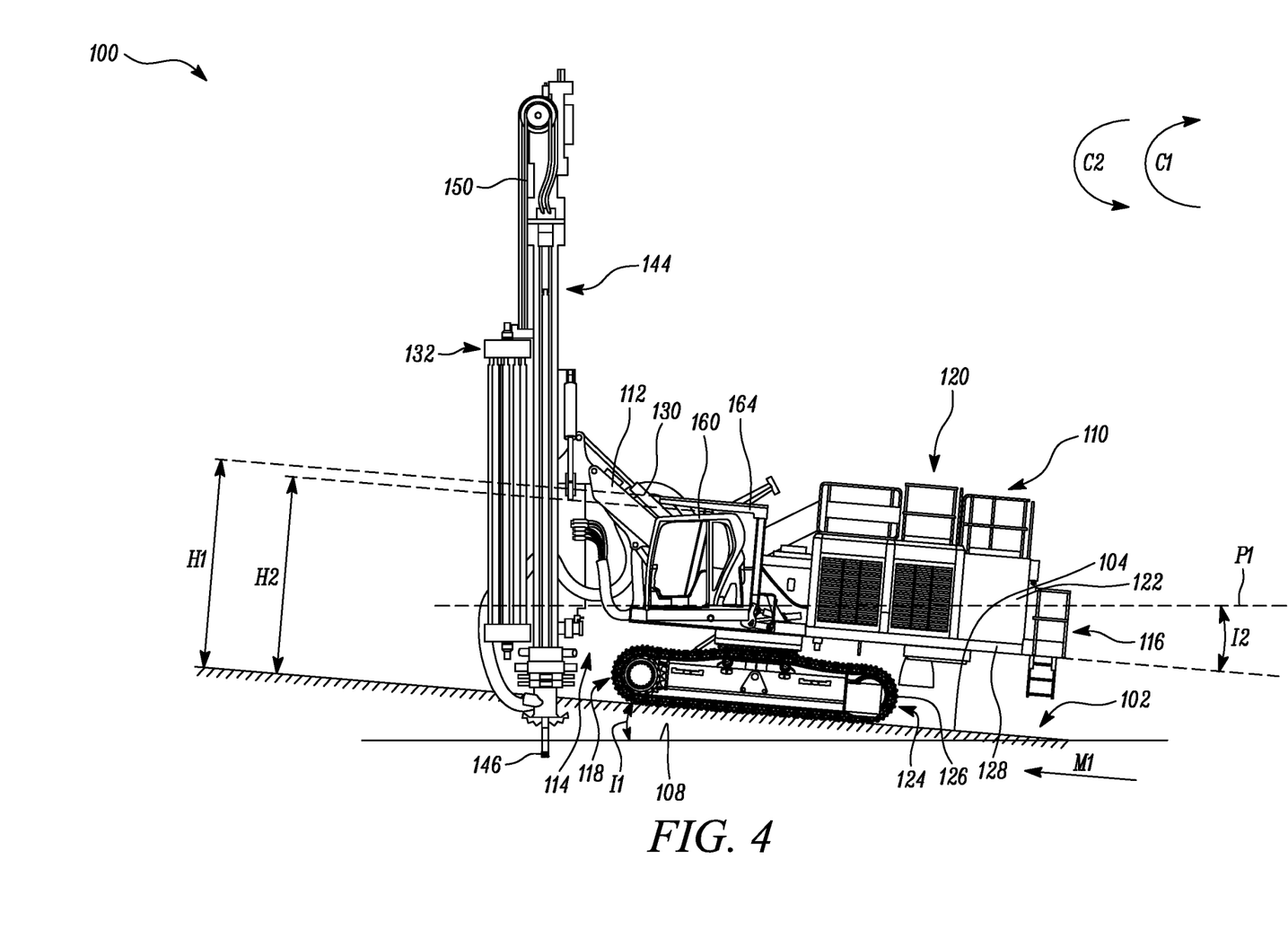
FIG. 4 illustrates a side view the work machine during an uphill movement thereof, according to examples of the present disclosure.
Figure 6:
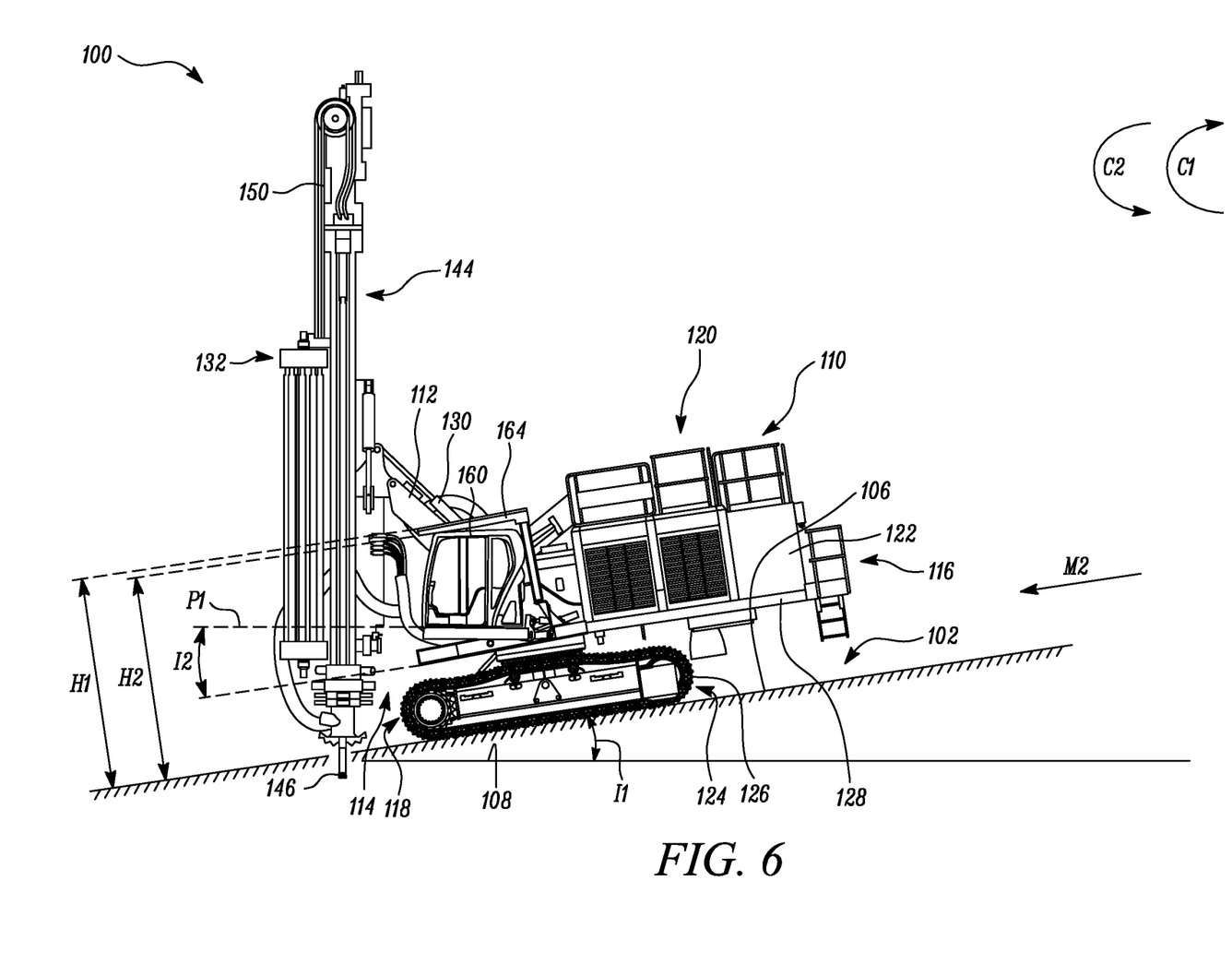
FIG. 6 illustrates a side view the work machine during a downhill movement thereof, according to examples of the present disclosure.

Further, when the work machine 100 is operating on uneven surfaces or the slopes 104, 106, the work machine 100 may be disposed at a first pitch angle "I1" (shown in FIGS. 4 and 6) relative to a non-inclined surface 108 (shown in FIGS. 4 and 6). It should be noted that the term "non-inclined surface" as used herein may be defined as a surface having zero slope or inclination with respect to a basic ground plane. For example, when the work machine 100 is ascending the slope 104 or descending the slope 106, the work machine 100 may be disposed at the first pitch angle "I1". The first pitch angle "I1" may be defined between a horizontal plane of the work machine 100 and the non-inclined surface 108. The term "first pitch angle" as used herein may refer to an angle by which the work machine 100 may be inclined relative to the non-inclined surface 108.

The work machine 100 includes a movable carrier 110. The movable carrier 110 defines a front end 114 and a rear end 116. The movable carrier 110 includes a lower structure 118 and an upper structure 120 movably coupled with the lower structure 118, more specifically the upper structure 120 is rotatably coupled to the lower structure 118 on a vertical axis. The upper structure 120 may support one or more components of the work machine 100 thereon. The upper structure 120 defines an enclosure 122. The enclosure 122 allows mounting of a power source (not shown). The power source may provide operating power to the work machine 100 for mobility and operational requirements. The power source may include, but not limited to, a diesel engine, a gasoline engine, a gaseous fuel powered engine, a dual fuel powered engine, an electric motor, a fuel cell, a battery, and/or a combination thereof, based on application requirements. Additionally, the work machine 100 may include components and/or systems (not shown), such as a fuel delivery system, an air delivery system, a lubrication system, a propulsion system, a drivetrain, a drive control system, a machine control system, and so on, based on application requirements.

The lower structure 118 includes an undercarriage structure 124. The undercarriage structure 124 includes a set of ground engaging members 126 (only one ground engaging member 126 is shown in the accompanying figure). In the illustrated example of FIG. 1, the ground engaging members 126 are embodied as tracks. In other examples, the ground engaging members 126 may embody wheels. The ground engaging members 126 support and provide mobility to the work machine 100 on the ground surface 102. As such, the ground engaging members 126 provide movement, turning, positioning, and travel of the work machine 100 on the ground surface 102.

The work machine 100 further includes a deck frame 128. As such, the deck frame 128 may provide an operating surface for the operator to move around the work machine 100 or be stationed on the work machine 100, to support one or more components of the work machine 100, and so on. The work machine 100 also includes a boom member 112. The boom member 112 is coupled to the movable carrier 110. Specifically, the boom member 112 is movably coupled to the upper structure 120 using a shift cylinder 130.

Further, the work machine 100 includes a feed assembly 132 movably coupled to the boom member 11 proximate the front end 114 of the work machine 100. The feed assembly 132 includes an upright feed table 134 disposed on the upper structure 120. The feed table 134 supports one or more drilling components of the work machine 100. The feed table 134 allows a drill string 136 to move relative to the feed table 134. The feed table 134 may include a drive motor (not shown) for moving the drill string 136. The feed table 134 is pivotally coupled to the upper structure 120 by the boom member 112. As such, the feed assembly 132 is movable relative to the upper structure 120 between a substantially vertical position and a non-vertical position, also known as a rest position, based on operation of the shift cylinder 130. In the rest position, the boom member 112 rests on a feed rest 138.

The work machine 100 includes a work device 140. The work device 140 is embodied as a drill assembly herein. The work device 140 is movably disposed on the feed table 134 via a mast 144. The work device 140 may be used to drill holes, channels, tunnels, openings, and so on, into and/or below, the ground surface 102. The work device 140 includes a drill bit 146 such that the drill string 136 is removably coupled to the drill bit 146. The drill string 136 includes one or more columns or pipes 148 interlinked with each other and with the drill bit 146. The pipes 148 may provide extension of the drill bit 146 into a portion of the ground surface 102.

The feed assembly 132 also includes a carousel 152. The carousel 152 is disposed on the feed table 134 via the mast 144. The carousel 152 may store and support one or more pipes 148 of the work device 140 when the work device 140 is not in use. It should be noted that the boom member 112 and the feed assembly 132 can be moved to various angles based on movement of the shift cylinder 130 or other cylinders associated with the boom member 112 and the feed assembly 132. Thus, the work machine 100 can be used to perform drilling operations at various angles, as per application requirements.

Figure 2:
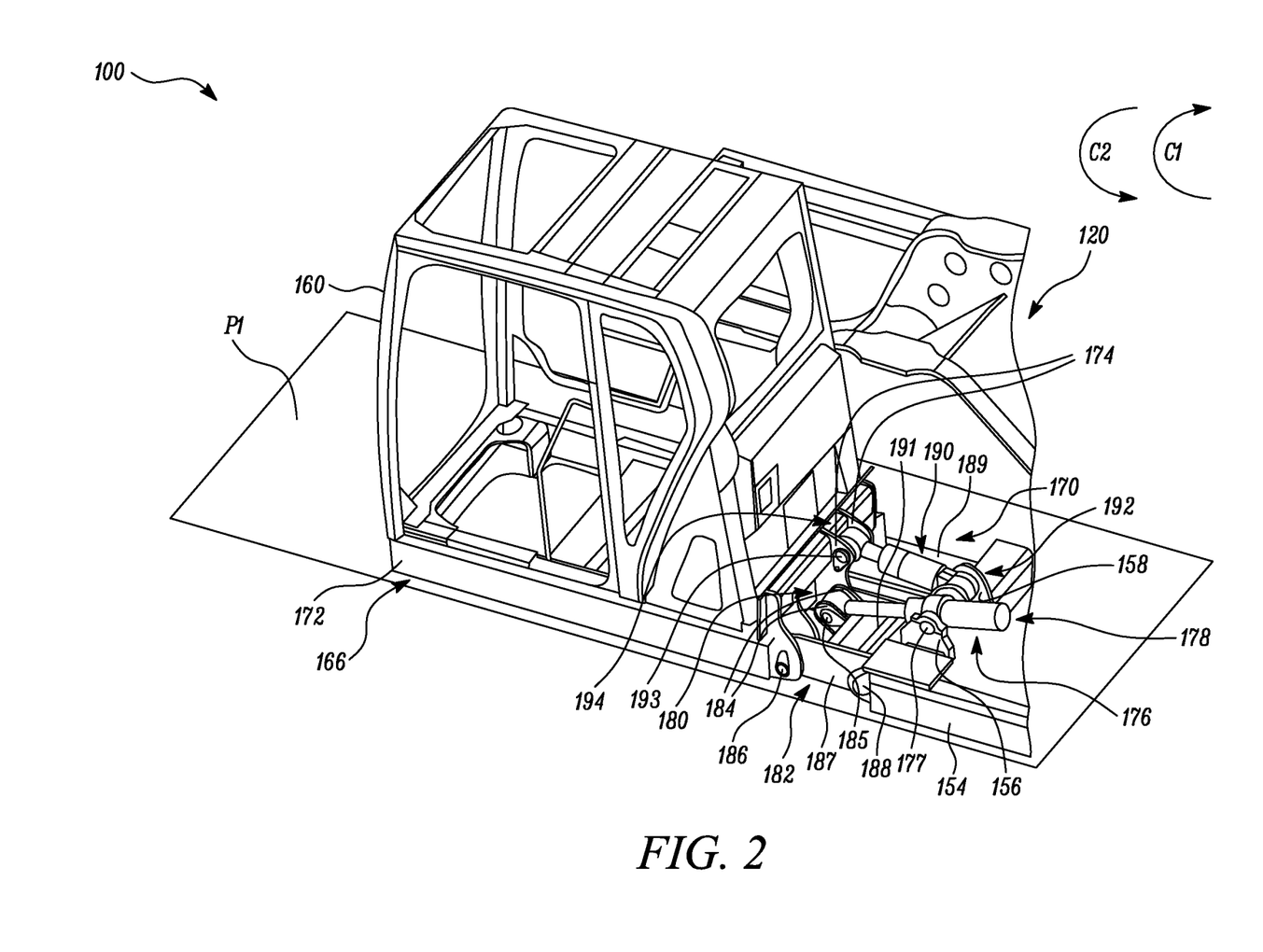
FIG. 2 illustrates a perspective view of a frame structure and a tilting mechanism associated with the work machine of FIG. 1, according to examples of the present disclosure.

As shown in FIG. 2, the work machine 100 includes a frame structure 154. The frame structure 154 may form a part of the upper structure 120. The frame structure 154 is generally rectangular in shape and may support various machine components thereon. The frame structure 154 includes a first pair of brackets 156 and a second pair of brackets 158.

Further, the work machine 100 also includes an operator cabin 160 movably coupled to the frame structure 154. As such, the operator cabin 160 forms a part of the upper structure 120. The operator cabin 160 defines a cuboidal shaped structure. Further, the operator cabin 160 defines a plane "P1". The plane "P1" may be generally parallel to a floor of the operator cabin 160. Moreover, when the work machine 100 is operating on a flat surface, the plane "P1" defined by the operator cabin 160 is substantially parallel to the non-inclined surface 108 (see FIGS. 4 and 6). The operator cabin 160 may include one or more controls, such as, operator consoles, joysticks, pedals, levers, buttons, switches, steering, and so on. The controls may be used to control an operation of the work machine 100 on the ground surface 102 (see FIGS. 1, 4, and 6).

Further, the operator cabin 160 defines a maximum height "H2" (shown in FIGS. 1, 4, and 6) relative to the ground surface 102. The maximum height "H2" may vary based on tilting of the operator cabin 160. When the first pitch angle "I1" is 0 Degrees, the maximum height "H2" is defined between the ground surface 102 and a top surface of the operator cabin 160 (as illustrated in FIG. 1). Further, when the operator cabin 160 is tilted, the maximum height "H2" is defined between the ground surface 102 and a topmost point of the operator cabin 160 (as illustrated in FIGS. 4 and 6). In an example, the maximum height "H2" defined by the operator cabin 160 relative to the ground surface 102 is less than 3.5 meters. It should be noted that the maximum height "H2" may vary as per the allowable shipping height.

Further, the work machine 100 includes an output module 162 (shown in FIG. 3) that may be disposed within the operator cabin 160. The output module 162 may provide various notifications to the operator, without any limitations. For example, the output module 162 may presents the first pitch angle "I1" and a second pitch angle "I2" (shown in FIGS. 4, 5, 6, and 7) thereon.

The output module 162 may include a display screen to display the first and/or second pitch angle "I1", "I2" in a text format. In some examples, the output module 162 may be handheld by the operator such that the handheld device displays notifications corresponding to the first and/or second pitch angles "I1", "I2" thereon. The output module 162 may display the notifications via a short message service (SMS), a multimedia message service (MMS), a poll notification, an electronic mail (e-mail), and the like. In an example, the output module 162 may be a portable computing device that operates using a portable power source such as a battery. Examples of the portable computing device may include, but are not limited to, a mobile phone, a smart phone, a palm top, a tablet, a laptop, and the like. Additionally, or alternatively, the output module 162 may provide audio notifications. In such an example, the output module 162 may generate audio notifications or voice alerts. For example, the output module 162 may embody a speaker that provides the audio notifications to the operator.

Figure 5:
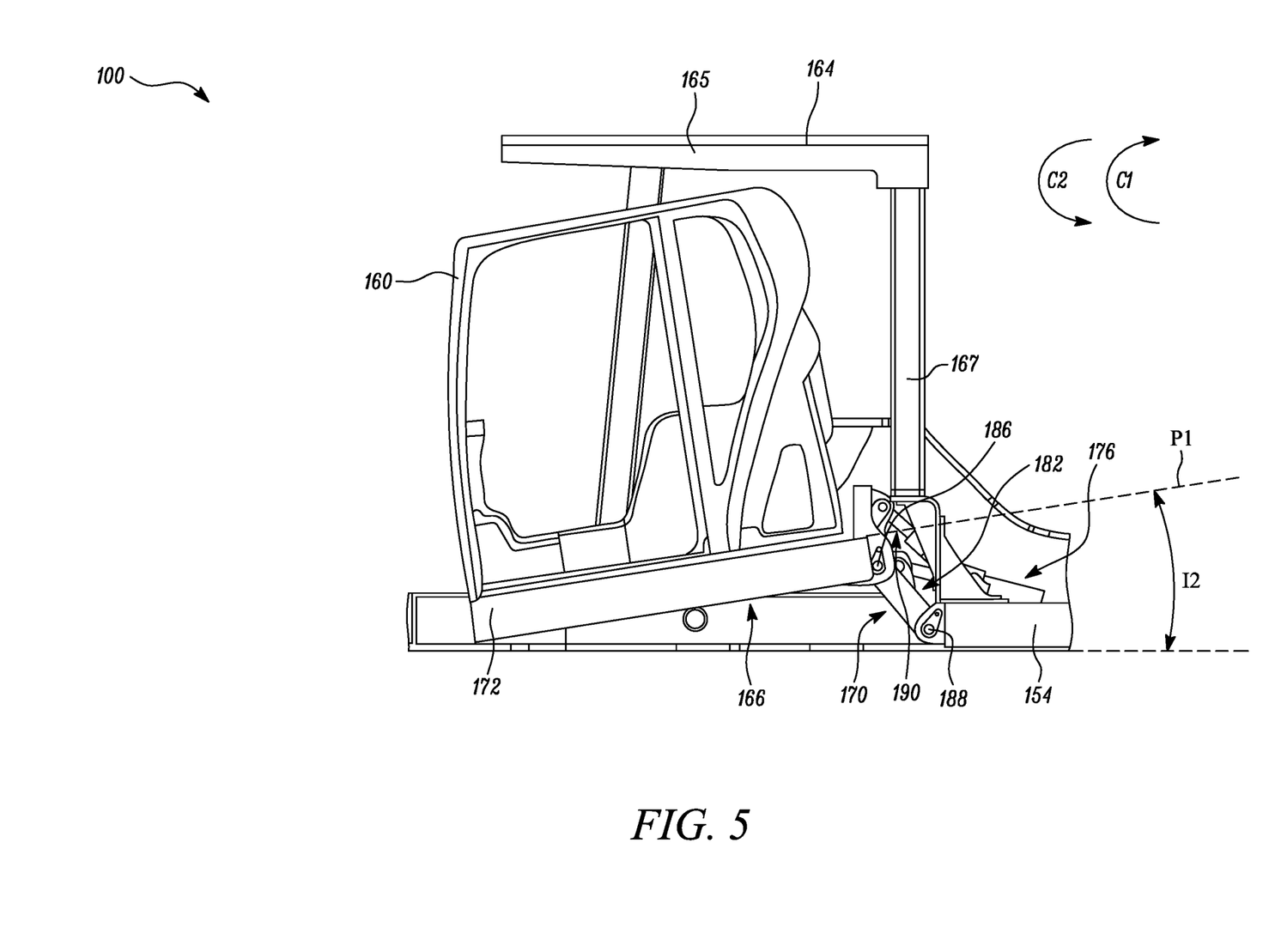
FIG. 5 illustrates a side view of the operator cabin tilted in an anti-clockwise direction, according to examples of the present disclosure.
Figure 7:
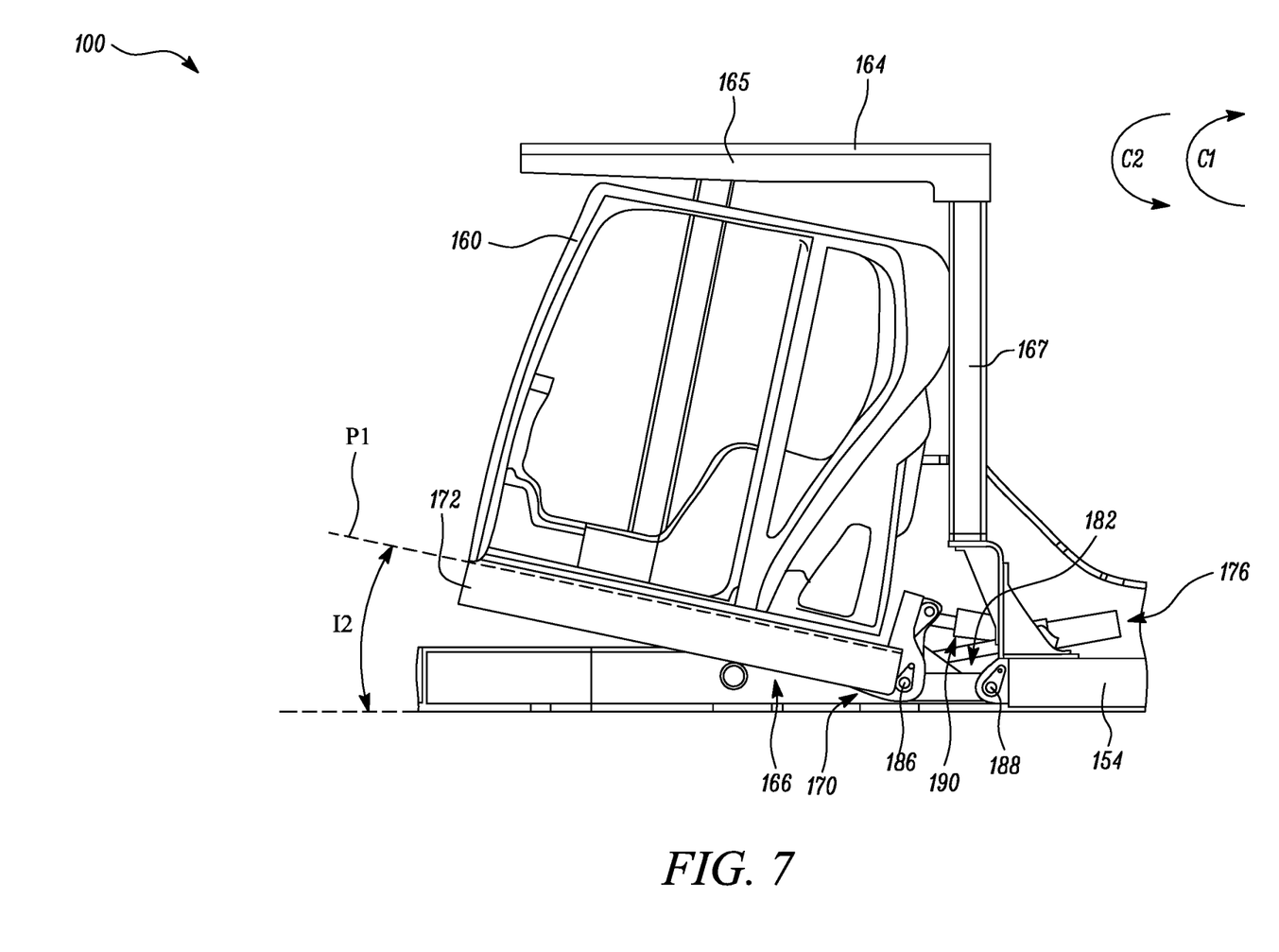
FIG. 7 illustrates a side view of the operator cabin tilted in a clockwise direction, according to examples of the present disclosure.

The work machine 100 further includes a rollover protection structure 164 (shown in FIGS. 1, 5, and 7). The rollover protection structure 164 is mounted to prevent toppling of the work machine 100 on slopes, such as, the slopes 104, 106 (see FIGS. 4 and 6). The rollover protection structure 164 defines a height "H1" (shown in FIGS. 1, 4, and 6) relative to the ground surface 102. The rollover protection structure 164 includes a substantially L-shaped structure including a first portion 165 (shown in FIGS. 5 and 7) and a second portion 167 (shown in FIGS. 5 and 7) that is perpendicular to the first portion 165. The height "H1" is defined between a top surface of the first portion 165 of the rollover protection structure 164 and the ground surface 102. In some examples, the height "H1" may be substantially equal to 3.5 meters as per an allowable shipping height.

The work machine 100 includes a system 166 for automatic tilting of the operator cabin 160. In an example, the system 166 may be automatically activated when the work machine 100 is in a drill mode. In other examples, the system 166 may be activated based on activation of a button by an operator when the work machine 100 is in a tram mode. The system 166 includes one or more first sensors 168 (shown in FIG. 3) coupled to the work machine 100. The one or more first sensors 168 generate a first signal indicative of the first pitch angle "I1" of the work machine 100 relative to the non-inclined surface 108.

In an example, the first sensor 168 may include an inertial measurement unit. In another example, the first sensor 168 may include an inclinometer. Alternatively, the first sensor 168 may include any other type of sensor, such as a position sensor, a tilt sensor, and the like, or a combination of sensors that realizes the function of the first sensor 168, as per requirements. In an example, the first sensor 168 may be disposed on the frame structure 154 or at any other location on the upper structure 120 of the work machine 100. In another example, the first sensor 168 may be disposed on the operator cabin 160 of the work machine 100. In yet another example, the first sensor 168 may be disposed on the boom member 112 (see FIG. 1) or the feed assembly (see FIG. 1).

The system 166 also includes a tilting mechanism 170 for tilting the operator cabin 160 relative to the frame structure 154. More specifically, the tilting mechanism 170 tilts the operator cabin 160 based on the first pitch angle "I1" of the work machine 100 relative to the non-inclined surface 108. The tilting mechanism 170 includes a mounting structure 172 fixedly coupled with the operator cabin 160. As such, the operator cabin 160 moves with the mounting structure 172. The mounting structure 172 defines a substantially rectangular shaped structure. The mounting structure 172 may be manufactured using an alloy steel. The mounting structure 172 includes a third pair of brackets 174.

The tilting mechanism 170 also includes a first actuator 176 defining a first end 178 and a second end 180. The first end 178 of the first actuator 176 is movably coupled to the frame structure 154 and the second end 180 of the first actuator 176 is movably coupled to the mounting structure 172. More specifically, the first end 178 of the first actuator 176 is movably coupled to the first pair of brackets 156 of the frame structure 154 via a pair of mechanical fasteners 177.

Furthermore, the tilting mechanism 170 includes an adjustable linkage assembly 182, such that the second end 180 of the first actuator 176 is movably coupled to the mounting structure 172 via the adjustable linkage assembly 182. Specifically, the adjustable linkage assembly 182 includes a fourth pair of brackets 184. The second end 180 of the first actuator 176 is movably coupled to the fourth pair of brackets 184 via a pair of mechanical fasteners 185. The adjustable linkage assembly 182 includes a generally I-shaped structure defining a first section 187, a second section 189, and a third section 191 extending perpendicularly between the first and second sections 187, 189. The fourth pair of brackets 184 extend from the third section 191. Further, one end of each of the first and second sections 187, 189 is movably coupled to the mounting structure 172 via a number of first mechanical fasteners 186 (only one of which is illustrated herein). Moreover, another end of each of the first and second sections 187, 189 is movably coupled with the frame structure 154 via a number of second mechanical fasteners 188 (only one of which is illustrated herein).

The tiling mechanism 170 further includes a second actuator 190 defining a third end 192 and a fourth end 194. The third end 192 of the second actuator 190 is movably coupled to the frame structure 154 and the fourth end 194 of the second actuator 190 is movably coupled to the mounting structure 172. More specifically, the third end 192 of the second actuator 190 is movably coupled to the second pair of brackets 158 of the frame structure 154 via a pair of mechanical fasteners (not shown). Further, the fourth end 194 of the second actuator 190 is movably coupled to the third pair of brackets 174 of the mounting structure 172 via a pair of mechanical fasteners 193.

The first actuator 176 and the second actuator 190 may include a hydraulic actuator or a pneumatic actuator. The first actuator 176 and the second actuator 190 may include a cylinder, a piston, and a rod. The first actuator 176 and the second actuator 190 may include solenoids. The solenoids may be controlled to cause the rod of the respective first and second actuators 176, 190 to extend or retract. The tilting mechanism 170 further includes a second sensor 196 (shown in FIG. 3) to generate a second signal indicative of a position of the first actuator 176. For example, the second sensor 196 may generate second signals indicative of an extended state of the first actuator 176 or a retracted state of the first actuator 176. In an example, the second sensor 196 may include an in-cylinder position sensor. Alternatively, the second sensor 196 may include any other type of sensor that generates the second signals indicative of the position of the first actuator 176, without any limitations.

The tilting mechanism 170 further includes a third sensor 198 (shown in FIG. 3) to generate a third signal indicative of a position of the second actuator 190. For example, the third sensor 198 may generate third signals indicative of an extended state of the second actuator 190 or a retracted state of the second actuator 190. In an example, the third sensor 198 may include an in-cylinder position sensor. Alternatively, the third sensor 198 may include any other type of sensor that generates the third signals indicative of the position of the second actuator 190, without any limitations.

Figure 3:
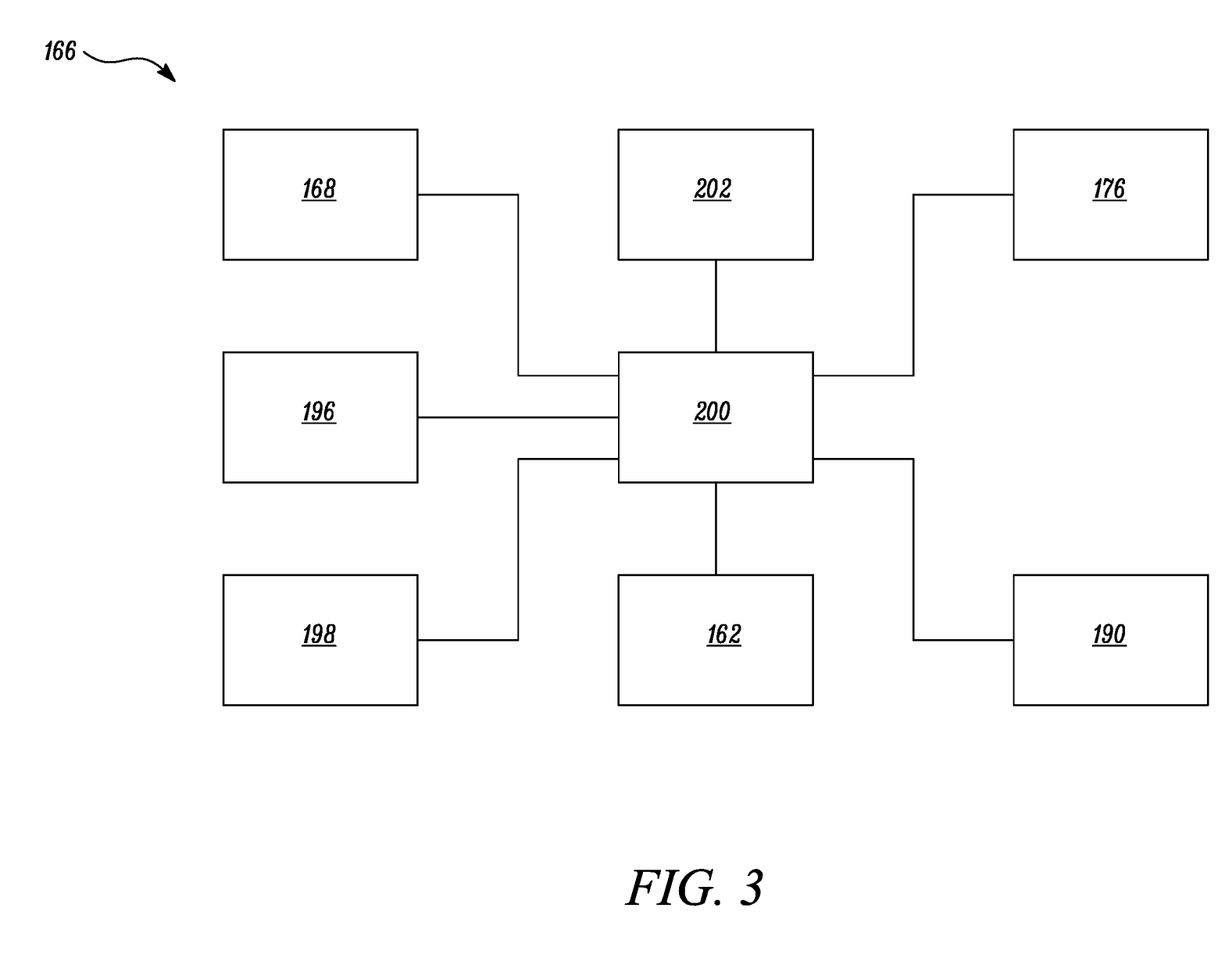
FIG. 3 illustrates a block diagram of a system for automatic tilting of an operator cabin shown in FIGS. 1 and 2, according to examples of the present disclosure.

Referring to FIG. 3, the system 166 includes a controller 200 communicably coupled to the one or more first sensors 168, the first actuator 176, and the second actuator 190. Further, the controller 200 is also communicably coupled to the second sensor 196 and the third sensor 198. The controller 200 may embody a single microprocessor or multiple microprocessors. In some examples, an electronic control module (ECM) of the work machine 100 may perform the intended functions of the controller 200, without any limitations. Numerous commercially available microprocessors may be configured to perform the functions of the controller 200. It should be appreciated that the controller 200 may embody a machine microprocessor capable of controlling numerous machine functions. A person of ordinary skill in the art will appreciate that the controller 200 may additionally include other components and may also perform other functions not described herein. A person of ordinary skill in the art will appreciate that the controller 200 may include multiple components for performing intended functions/operations.

The system 166 includes a memory 202. The memory 202 may be communicably coupled to the controller 200. The memory 202 may include a flash memory, a random-access memory (RAM), an electrically erasable programmable read-only memory (EEPROM), and the like. The memory 202 may be a stand-alone device or the memory 202 may be an integral component of the control 200. The memory 202 may be used to store data such as algorithms, instructions, arithmetic operations, and the like. The controller 200 may execute various types of digitally-stored instructions, such as a software or an algorithm, retrieved from the memory 202, or a firmware program which may enable the system 166 to perform a wide variety of operations. Further, the memory 202 may store a predetermined threshold value "V1" of the first pitch angle "I1" (see FIGS. 4 and 6) and a predetermined threshold range "R1" of the second pitch angle "I2" (see FIGS. 4, 5, 6, and 7).

The controller 200 receives the first signal indicative of the first pitch angle "I1" of the work machine 100. Specifically, the controller 200 receives the first signal indicative of the first pitch angle "I1" from the first sensor 168. When the work machine 100 is disposed on the uphill slope 104 (see FIG. 4) or the downhill slope 106 (see FIG. 6), the frame structure 154 of the work machine 100 may be disposed at the first pitch angle "I1" with respect to the non-inclined surface 108 (see FIGS. 4 and 6). Further, the controller 200 controls the first or second actuators 176, 190 to tilt the operator cabin 160 (see FIG. 2) by the second pitch angle "I2" relative to the non-inclined surface 108.

In an example, the controller 200 may initiate the tilting of the operator cabin 160 only when the first pitch angle "I1" is greater than the predetermined threshold value "V1". The predetermined threshold value "V1" is greater than 0 Degrees. For example, the predetermined threshold value "V1" may be about 0.5 Degrees, 1 Degree, 2 Degrees, and the like. Based on the tilting of the operator cabin 160 relative to the frame structure 154, the plane "P1" (see FIGS. 4 and 6) defined by the operator cabin 160 is substantially parallel to the non-inclined surface 108. Further, the maximum height "H2" (see FIGS. 1, 4, and 6) defined by the operator cabin 160 relative to the ground surface 102 after the titling of the operator cabin 160 is lesser than the height "H1" (see FIGS. 1, 4, and 6) defined by the rollover protection structure 164 relative to the ground surface 102.

It should be noted that the controller 200 determines the second pitch angle "I2" based on the first pitch angle "I1". It should be noted that the second pitch angle "I2" may be measured between the plane "P1" and the frame structure 154. Further, the controller 200 compares the second pitch angle "I2" with the predetermined threshold range "R1" of the second pitch angle "I2". The predetermined threshold range "R1" includes a minimum value and a maximum value by which the operator cabin 160 can be moved. The controller 200 compares the determined second pitch angle "I2" with the minimum value and the maximum value. In an example, the maximum value of the second pitch angle "I2" is less than 14 degrees. Further, in some examples, the maximum value of the second pitch angle "I2" may be about 11 degrees. In an example, the minimum value may be greater than 0 Degrees and may be approximately equal to 0.5 Degrees, 1 Degree, or 2 Degrees, such that the operator cabin 160 is tilted only when the second pitch angle "I2" is greater than 0 Degrees.

It should be noted that if the determined second pitch angle "I2" is greater than the predetermined threshold range "R1", the controller 200 may tilt the operator cabin 160 by the maximum value for the second pitch angle "I2". For example, if the second pitch angle "I2" is greater than 15 Degrees, the operator cabin 160 may be tilted by 11 Degrees. It should be noted that values of the predetermined threshold range "R1", the minimum value, and the maximum value as mentioned herein are exemplary in nature, and the values may vary as per application requirements.

In some examples, the second pitch angle "I2" may be equal in magnitude to the first pitch angle "I1". For example, if the second pitch angle "I2" is within the predetermined threshold range "R1" of the second pitch angle "I2", the controller 200 generates an output signal for moving the operator cabin 160 by the determined second pitch angle "I2". However, if the determined second pitch angle "I2" is more than the maximum value, the controller 200 moves the operator cabin 160 by the maximum value of the second pitch angle "I2".

Further, the second pitch angle "I2" is opposite in direction to the first pitch angle "I1". More particularly, a direction of movement of the operator cabin 160 may be based on an uphill movement "M1" (see FIG. 4) or a downhill movement "M2" (see FIG. 6) of the work machine 100. Accordingly, the operator cabin 160 may tilt in a clockwise direction "C1" (see FIGS. 6 and 7) or an anti-clockwise direction "C2" (see FIGS. 4 and 5) by the second pitch angle "I2" based on the downhill movement "M2" or the uphill movement "M1", respectively, of the work machine 100. For example, if the work machine 100 tilts in the clockwise direction "C1" based on the uphill movement "M1" of the work machine 100, the operator cabin 160 may tilt by the second pitch angle "I2" in the anti-clockwise direction "C2". Further, if the work machine 100 tilts in the anti-clockwise direction "C2" based on the downhill movement "M2" of the work machine 100, the operator cabin 160 may tilt by the second pitch angle "I2" in the clockwise direction "C1".

Moreover, the controller 200 controls the first or second actuators 176, 190 for tilting the operator cabin 160 such that the second pitch angle "I2" lies within the predetermined threshold range "R1" of the second pitch angle "I2". Specifically, a movement of the rods of the first actuator 176 and the second actuator 190 may cause the operator cabin 160 to move relative to the frame structure 154. For example, the extension and/or the retraction of the first or second actuators 176, 190 may cause the operator cabin 160 to rotate in the clockwise or anti-clockwise direction "C1", "C2" by the second pitch angle "I2". In some examples, the controller 200 may receive the second and third signals for controlling the first or second actuators 176, 190, respectively, such that the second pitch angle "I2" is substantially equal to the first pitch angle "I1". The second and third signals are received from the second and third sensors 196, 198, respectively. The second and third signals may be used to adjust the first or second actuators 176, 190, respectively, to adjust the operator cabin 160 such that the second pitch angle "I2" is substantially equal to the first pitch angle "I1".

FIG. 4 illustrates the work machine 100 disposed on the uphill slope 104. In this example, the work machine 100 is disposed at the first pitch angle "I1" relative to the non-inclined surface 108. In such an example, the controller 200 determines the uphill movement "M1" of the work machine 100. The uphill movement "M1" may be determined based on determination of the first pitch angle "I1" and the direction of the first pitch angle "I1". As shown in FIG. 5, the controller 200 (see FIG. 3) generates a first control signal to retract each of the first actuator 176 and the second actuator 190 for tilting the operator cabin 160 in the anti-clockwise direction "C2" based on the uphill movement "M1" of the work machine 100. It should be noted that the first and second actuators 176, 190 may be retracted by different values for tilting the operator cabin 160 in the anti-clockwise direction "C2". In some examples, when the second pitch angle "I2" is equal to 11 Degrees, the controller 200 may fully retract the first actuator 176 and partially retract the second actuator 190.

FIG. 6 illustrates the work machine 100 disposed on the downhill slope 106. In this example, the work machine 100 is disposed at the first pitch angle "I1" relative to the non-inclined surface 108. In such an example, the controller 200 determines the downhill movement "M2" of the work machine 100. The downhill movement "M2" may be determined based on determination of the first pitch angle "I1" and the direction of the first pitch angle "I1". As shown in FIG. 7, the controller 200 (see FIG. 3) generates a second control signal to extend the first actuator 176 and retract the second actuator 190 for tilting the operator cabin 160 in the clockwise direction "C1" based on the downhill movement "M2" of the work machine 100. In some examples, when the second pitch angle "I2" is equal to 11 Degrees, the controller 200 may fully retract the second actuator 190 and fully extend the first actuator 176.

Further, the output module 162 (see FIG. 3) is communicably coupled with the controller 200. The output module 162 may present the first pitch angle "I1" or the second pitch angle "I2" thereon. Further, the tilting of the operator cabin 160 of the work machine 100 may be carried out based on execution of a computer program or an algorithm. The computer program or the algorithm may be stored in the memory 202 and executed by the controller 200. The computer program or the algorithm may include a program code means to cause the work machine 100 to execute a number of method steps.

Figure 8:
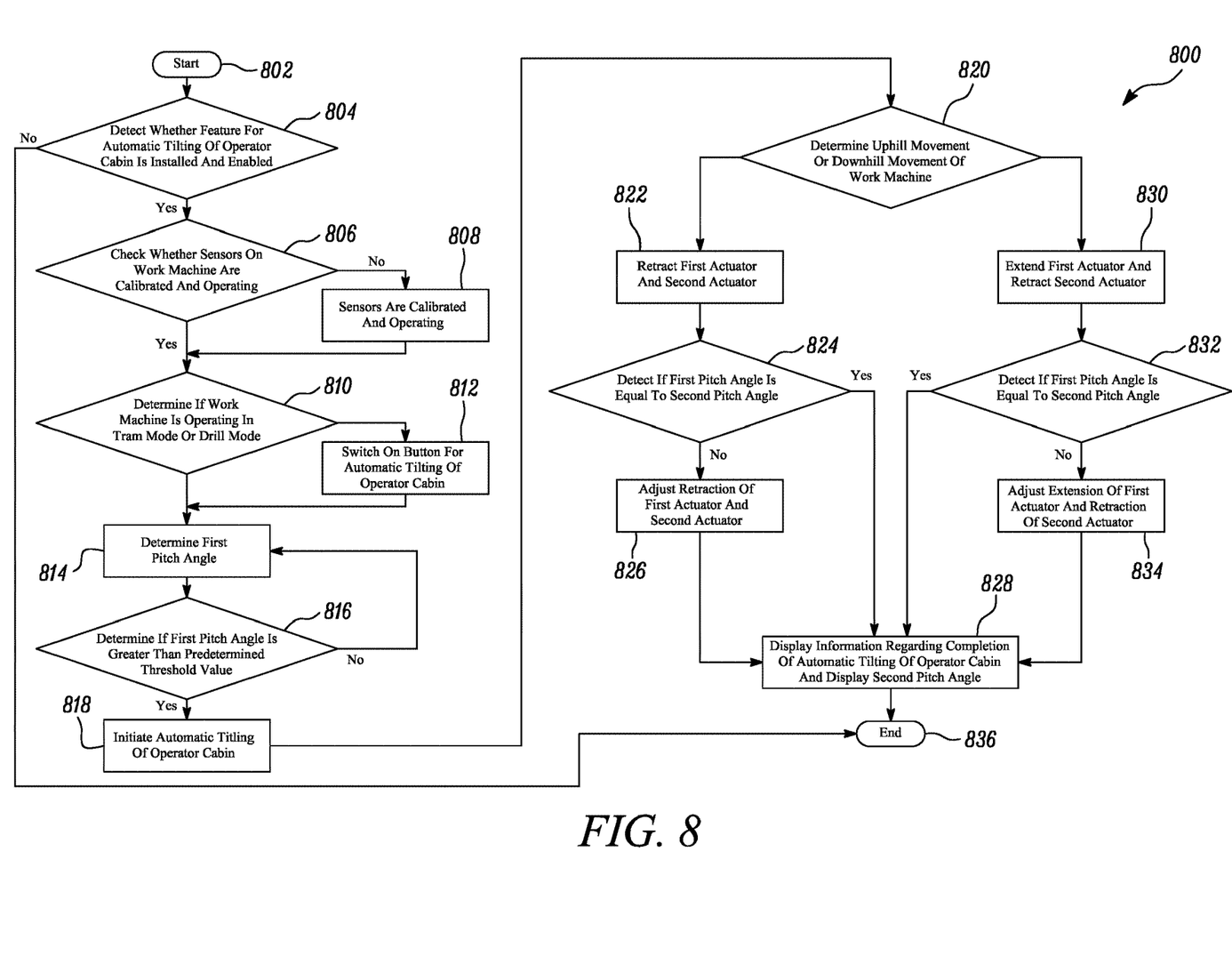
FIG. 8 illustrates a flowchart for a process of automatic tilting of the operator cabin shown in FIGS. 1 and 2, according to examples of the present disclosure.

FIG. 8 illustrates a flowchart for a process 800 (or an algorithm) for automatic tilting of the operator cabin 160 of the work machine 100. Referring to FIGS. 1 to 8, the process 800 may be executed by the controller 200. The process 800 may be stored within the memory 202 of the system 166 and may be retrieved therefrom for execution by the controller 200. At a block 802, the process 800 starts or begins operation. The process 800 then moves to a block 804. At the block 804, the controller 200 detects whether a feature for automatic tilting of the operator cabin 160 is installed and enabled. If the feature for automatic tilting of the operator cabin 160 is installed and enabled, the process 800 moves to a block 806.

At the block 806, the controller 200 checks whether the first, second, and third sensors 168, 196, 198 are calibrated and operating. If any of the first, second, and third sensors 168, 196, 198 are not calibrated, the process 800 moves to a block 808 for calibrating the first, second, or third sensors 168, 196, 198. However, if the first, second, and third sensors 168, 196, 198 are calibrated and operating, the process 800 moves to a block 810.

At the block 810, the controller 200 determines if the work machine 100 is in the tram mode or in the drill mode. If the work machine 100 is in the tram mode, the process 800 moves to a block 812. At the block 812, the operator of the work machine 100 may activate the button for automatic tilting of the operator cabin 160 of the work machine 100. The process 800 further moves to a block 814. However, if the controller 200 determines that the work machine 100 is in the drill mode at the block 810, the process 800 directly moves to the block 814 from the block 810. At the block 814, the controller 200 determines the first pitch angle "I1" based on the first signal received from the first sensor 168. Further, the controller 200 may determine the first pitch angle "I1" at regular intervals. In an example, the controller 200 may determine the first pitch angle "I1" every 500 milli seconds.

From the block 814, the process 800 then moves to a block 816. At the block 816, the controller 200 determines if the first pitch angle "I1" is greater than the predetermined threshold value "V1". If the first pitch angle "I1" is lesser than the predetermined threshold value "V1", the process 800 moves to the block 814. However, if the first pitch angle "I1" is greater than the predetermined threshold value "V1", the process 800 moves to a block 818. At the block 818, the automatic tilting of the operator cabin 160 of the work machine 100 is initiated to tilt the operator cabin 160 based on determination of the second pitch angle "I2". More particularly, the controller 200 may determine the second pitch angle "I2" for tilting the operator cabin 160 by the second pitch angle "I2".

The process 800 then moves to a block 820. At the block 820, the controller 200 determines the uphill movement "M1" or the downhill movement "M2" of the work machine 100. If the controller 200 determines the uphill movement "M1" of the work machine 100, the process 800 moves to a block 822. At the block 822, the controller 200 generates the first control signal to retract the first actuator 176 and the second actuator 190. The process 800 then moves to a block 824. At the block 824, the controller 200 determines if the first pitch angle "I1" is equal in magnitude to the second pitch angle "I2". If the first pitch angle "I1" and the second pitch angle "I2" are not equal in magnitude, the process 800 moves to a block 826. At the block 826, the retraction of the first actuator 176 and/or the second actuator 190 are adjusted based on the second and third signals from the second and third sensors 196, 198 such that the first pitch angle "I1" is equal in magnitude to the second pitch angle "I2" and the maximum height "H2" is less than 3.5 meters. From the block 826, the process 800 moves to a block 828. However, at the block 824, if the controller 200 determines that the first pitch angle "I1" and the second pitch angle "I2" are equal in magnitude, the process 800 directly moves to the block 828.

Further, at the block 820, if the controller 200 determines the downhill movement "M2" of the work machine 100, the process 800 moves to a block 830. At the block 830, the controller 200 generates the second control signal to extend the first actuator 176 and retract the second actuator 190. The process 800 then moves to a block 832. At the block 832, the controller 200 determines if the first pitch angle "I1" is equal in magnitude to the second pitch angle "I2". If the first pitch angle "I1" and the second pitch angle "I2" are not equal in magnitude, the process 800 moves to a block 834. At the block 834, the extension of the first actuator 176 and the retraction of the second actuator 190 are adjusted based on the second and third signals from the second and third sensors 196, 198 such that the first pitch angle "I1" is equal in magnitude to the second pitch angle "I2" and the maximum height "H2" is less than 3.5 meters. From the block 834, the process 800 moves to the block 828. However, at the block 832, if the controller 200 determines that the first pitch angle "I1" and the second pitch angle "I2" are equal in magnitude, the process 800 directly moves to the block 828.

At the block 828, the output module 162 displays information to the operator regarding completion of the automatic tilting of the operator cabin 160. Further, the output module 162 may also display the second pitch angle "I2" thereon. The process 800 then moves to a block 836 where the process 800 terminates or ends operation. It should be noted that, at the block 804, if the feature for automatic tilting of the operator cabin 160 is not installed and enabled, the process 800 directly moves to the block 838 where the process 800 terminates or ends operation.

INDUSTRIAL APPLICABILITY

The present disclosure relates to the system 166 and a method 900 for automatic tilting of the operator cabin 160 of the work machine 100. The system 166 and the method 900 described herein may ensure that the operator may be seated within the operator cabin 160 in the upright position when the work machine 100 moves on slopes for larger distances, thereby improving operator comfort.

In an example, the system 166 and the method 900 may tilt the operator cabin 160 by the second pitch angle "I2" in the clockwise direction "C1" or the anti-clockwise direction "C2". The second pitch angle "I2" is typically greater than 0 Degrees, and may lie between 0.5 Degrees and 14 Degrees, without any limitations. Further, the system 166 and the method 900 may allow tilting of the operator cabin 160 such that when the operator cabin 160 is in the tilted position, the maximum height "H2" defined between the operator cabin 160 and the ground surface 102 is less than 3.5 meters to comply with standard shipping height allowance.

Moreover, the system 166 may allow the operator to view ongoing drilling operations while being seated within the operator cabin 160. More particularly, the operator may have a clear view of the ongoing drilling operation, without adjusting an operator seat or without having to stand at intervals. The system 166 may further enhance an efficiency of the drilling operation being performed by the work machine 100.

Figure 9:
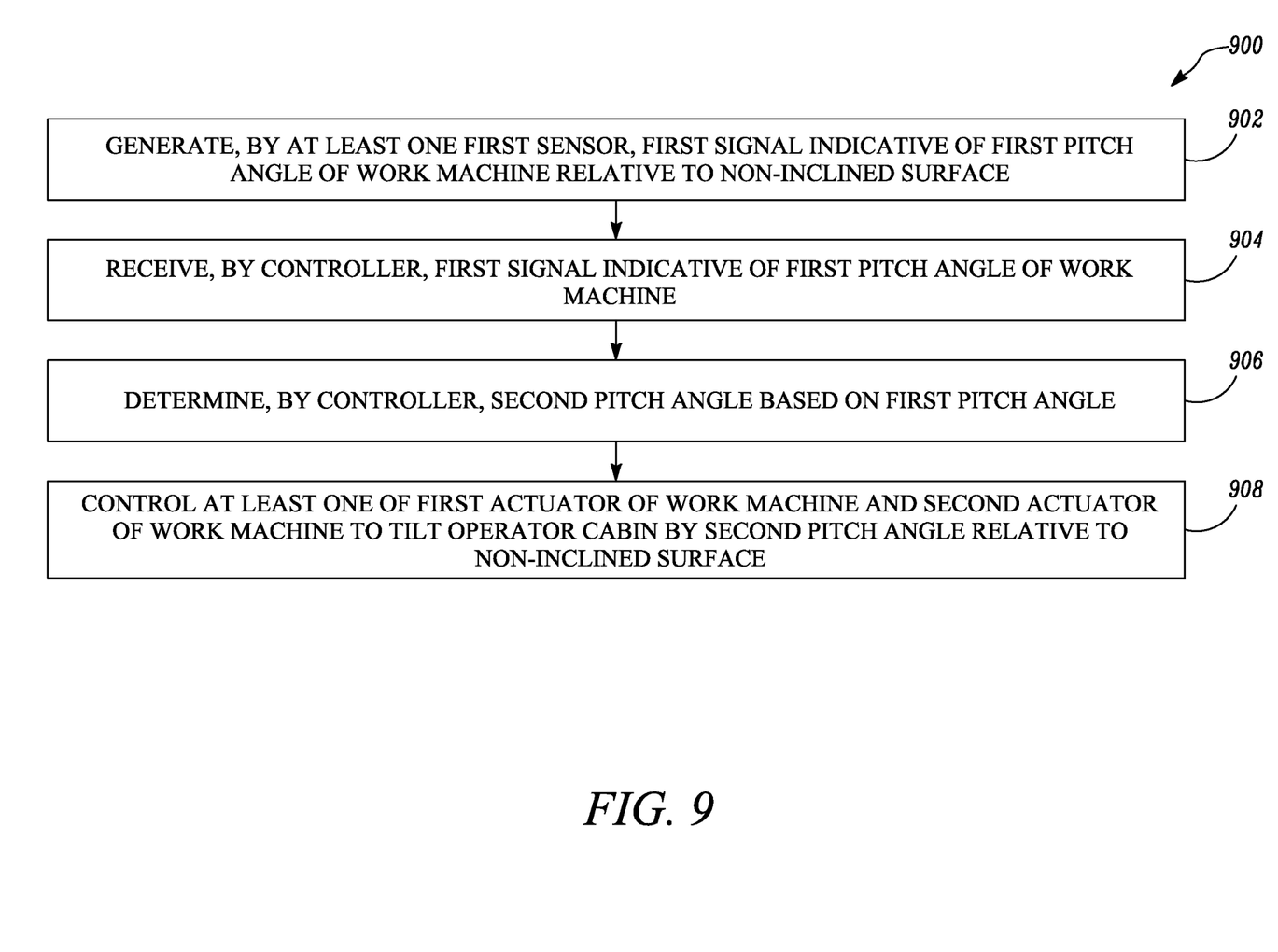
FIG. 9 illustrates a flowchart for a method of automatic tilting of the operator cabin of the work machine, according to examples of the present disclosure.

FIG. 9 illustrates a flowchart for the method 900 for automatic tilting of the operator cabin 160 of the work machine 100. The work machine 100 includes the frame structure 154. At step 902, the one or more first sensors 168 coupled to the work machine 100 generate the first signal indicative of the first pitch angle "I1" of the work machine 100 relative to the non-inclined surface 108. At step 904, the controller 200 of the work machine 100 receives the first signal indicative of the first pitch angle "I1" of the work machine 100. At step 906, the controller 200 determines the second pitch angle "I2" based on the first pitch angle "I1".

At step 908, the first actuator 176 of the work machine 100 and/or the second actuator 190 of the work machine 100 are controlled to tilt the operator cabin 160 by the second pitch angle "I2" relative to the non-inclined surface 108. The first actuator 176 defines the first end 178 and the second end 180. The first end 178 of the first actuator 176 is movably coupled to the frame structure 154 and the second end 180 of the first actuator 176 is movably coupled to the mounting structure 172 of the work machine 100. The second actuator 190 defines the third end 192 and the fourth end 194. The third end 192 of the second actuator 190 is movably coupled to the frame structure 154 and the fourth end 194 of the second actuator 190 is movably coupled to the mounting structure 172. Further, the second pitch angle "I2" is opposite in direction to the first pitch angle "I1". Furthermore, based on the tilting of the operator cabin 160 relative to the frame structure 154, the plane "P1" defined by the operator cabin 160 is substantially parallel to the non-inclined surface 108.

Further, the controller 200 compares the second pitch angle "I2" with the predetermined threshold range "R1" of the second pitch angle "I2". The controller 200 controls the first and/or second actuators 176, 190 for tilting the operator cabin 160 such that the second pitch angle "I2" lies within the predetermined threshold range "R1" of the second pitch angle "I2".

In some examples, the second sensor 196 generates the second signal indicative of the position of the first actuator 176. Moreover, the third sensor 198 generates the third signal indicative of the position of the second actuator 190. The controller 200 receives the second and third signals for controlling the first and/or second actuators 176, 190, respectively, such that the second pitch angle "I2" is substantially equal to the first pitch angle "I1".

In some examples, the controller 200 controls the first and/or second actuators 176, 190 such that the maximum value of the second pitch angle "I2" is about 11 degrees. Further, the operator cabin 160 is tilted such that the maximum height "H2" defined by the operator cabin 160 relative to the ground surface 102 is lesser than the height "H1" defined by the rollover protection structure 164 of the work machine 100 relative to the ground surface 102. In some examples, the operator cabin 160 is tilted such that the maximum height "H2" defined by the operator cabin 160 relative to the ground surface 102 is less than 3.5 meters.

Further, the controller 200 determines the uphill movement "M1" of the work machine 100. The controller 200 generates the first control signal to retract each of the first actuator 176 and the second actuator 190 for tilting the operator cabin 160 in the anti-clockwise direction "C2" based on the uphill movement "M1" of the work machine 100.

Moreover, the controller 200 determines the downhill movement "M2" of the work machine 100. The controller 200 generates the second control signal to extend the first actuator 176 and retract the second actuator 190 for tilting the operator cabin 160 in the clockwise direction "C1" based on the downhill movement "M2" of the work machine 100.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:

1. A system for automatic tilting of an operator cabin of a work machine, the work machine including a frame structure, the system comprising:
   at least one first sensor coupled to the work machine, wherein the at least one first sensor is configured to generate a first signal indicative of a first pitch angle of the work machine relative to a non-inclined surface;
   a lower structure rotatably coupled to the frame structure, the lower structure supporting the frame structure;
   a tilting mechanism adapted to tilt the operator cabin relative to the frame structure, the tilting mechanism including:
      a mounting structure fixedly coupled with the operator cabin;
      a first actuator defining a first end and a second end, wherein the first end of the first actuator is movably coupled to the frame structure and the second end of the first actuator is movably coupled to the mounting structure; and
      a second actuator defining a third end and a fourth end, wherein the third end of the second actuator is movably coupled to the frame structure and the fourth end of the second actuator is movably coupled to the mounting structure; and
   a controller communicably coupled to the at least one first sensor, the first actuator, and the second actuator, wherein the controller is configured to:
      receive the first signal indicative of the first pitch angle of the work machine;
      determine a second pitch angle based on the first pitch angle; and
      control at least one of the first and second actuators to tilt the operator cabin by the second pitch angle relative to the non-inclined surface, wherein the second pitch angle is opposite in direction to the first pitch angle;
      determine an uphill movement of the work machine and generate a first control signal to retract each of the first actuator and the second actuator for tilting the operator cabin in an anti-clockwise direction based on the uphill movement of the work machine; and
      determine a downhill movement of the work machine and generate a second control signal to extend the first actuator and retract the second actuator for tilting the operator cabin in a clockwise direction based on the downhill movement of the work machine; and wherein, based on a tilting of the operator cabin relative to the frame structure, a plane defined by the operator cabin is substantially parallel to the non-inclined surface.

2. The system of claim 1, wherein the tilting mechanism further includes an adjustable linkage assembly, such that the second end of the first actuator is movably coupled to the mounting structure via the adjustable linkage assembly.

3. The system of claim 2, wherein the adjustable linkage assembly is an I-shaped adjustable linkage assembly.

4. The system of claim 1, wherein the tilting mechanism further includes:
a second sensor configured to generate a second signal indicative of a position of the first actuator; and
a third sensor configured to generate a third signal indicative of a position of the second actuator,
wherein the controller is configured to receive the second and third signals for controlling at least one of the first and second actuators, respectively, such that the second pitch angle is substantially equal to the first pitch angle.

5. The system of claim 1, wherein a maximum value of the second pitch angle is less than 14 degrees.

6. The system of claim 1, wherein a maximum value of the second pitch angle is about 11 degrees.

7. The system of claim 1, wherein the work machine includes a rollover protection structure, such that a maximum height defined by the operator cabin relative to a ground surface after the titling of the operator cabin is lesser than a height defined by the rollover protection structure relative to the ground surface.

8. The system of claim 7, wherein the maximum height defined by the operator cabin relative to the ground surface is less than 3.5 meters.

9. The system of claim 1, wherein the controller is further configured to:
compare the second pitch angle with a predetermined threshold range of the second pitch angle; and
control at least one of the first and second actuators for tilting the operator cabin such that the second pitch angle lies within the predetermined threshold range of the second pitch angle.

10. A method for automatic tilting of an operator cabin of a work machine, the work machine including a frame structure, the method comprising:
mounting the operator cabin on the frame structure, wherein the frame structure is rotatably coupled to a lower structure;
generating, by at least one first sensor coupled to the work machine, a first signal indicative of a first pitch angle of the work machine relative to a non-inclined surface;
receiving, by a controller of the work machine, the first signal indicative of the first pitch angle of the work machine;
determining, by the controller, a second pitch angle based on the first pitch angle; and controlling at least one of a first actuator of the work machine and a second actuator of the work machine to tilt the operator cabin by the second pitch angle relative to the non-inclined surface,
determining, by the controller, an uphill movement of the work machine, and generating, by the controller, a first control signal to retract each of the first actuator and the second actuator for tilting the operator cabin in an anti-clockwise direction based on the uphill movement of the work machine;
determining, by the controller, a downhill movement of the work machine, and generating, by the controller, a second control signal to extend the first actuator and retract the second actuator for tilting the operator cabin in a clockwise direction based on the downhill movement of the work machine;
wherein the first actuator defines a first end and a second end, the first end of the first actuator being movably coupled to the frame structure and the second end of the first actuator being movably coupled to a mounting structure of the work machine;
wherein the second actuator defines a third end and a fourth end, the third end of the second actuator being movably coupled to the frame structure and the fourth end of the second actuator being movably coupled to the mounting structure;
wherein the second pitch angle is opposite in direction to the first pitch angle;
and
wherein, based on a tilting of the operator cabin relative to the frame structure, a plane defined by the operator cabin is substantially parallel to the non-inclined surface.

11. The method of claim 10 further comprising:
generating, by a second sensor, a second signal indicative of a position of the first actuator;
generating, by a third sensor, a third signal indicative of a position of the second actuator; and
receiving, by the controller, the second and third signals for controlling at least one of the first and second actuators, respectively, such that the second pitch angle is substantially equal to the first pitch angle.

12. The method of claim 10 further comprising controlling, by the controller, at least one of the first and second actuators such that a maximum value of the second pitch angle is about 11 degrees.

13. The method of claim 10 further comprising tilting the operator cabin such that a maximum height defined by the operator cabin relative to a ground surface is lesser than a height defined by a rollover protection structure of the work machine relative to the ground surface.

14. The method of claim 13 further comprising tilting the operator cabin such that the maximum height defined by the operator cabin relative to the ground surface is less than 3.5 meters.

15. The method of claim 10 further comprising:
comparing, by the controller, the second pitch angle with a predetermined threshold range of the second pitch angle; and
controlling, by the controller, at least one of the first and second actuators for tilting the operator cabin such that the second pitch angle lies within the predetermined threshold range of the second pitch angle.

16. The method of claim 10, wherein the tilting mechanism further includes an adjustable I-shaped linkage assembly, such that the second end of the first actuator is movably coupled to the mounting structure via the adjustable I-shaped linkage assembly.

17. A work machine comprising:
a frame structure;
an operator cabin movably coupled to the frame structure;
a lower structure rotatably coupled to the frame structure, the lower structure supporting the frame structure; and
a system for automatic tilting of the operator cabin, the system including:
at least one first sensor coupled to the work machine, wherein the at least one first sensor is configured to generate a first signal indicative of a first pitch angle of the work machine relative to a non-inclined surface;

a tilting mechanism for tilting the operator cabin relative to the frame structure, the tilting mechanism including:

a mounting structure fixedly coupled with the operator cabin;

a first actuator defining a first end and a second end, wherein the first end of the first actuator is movably coupled to the frame structure and the second end of the first actuator is movably coupled to the mounting structure; and a second actuator defining a third end and a fourth end, wherein the third end of the second actuator is movably coupled to the frame structure and the fourth end of the second actuator is movably coupled to the mounting structure; and a controller communicably coupled to the at least one first sensor, the first actuator, and the second actuator, wherein the controller is configured to:

receive the first signal indicative of the first pitch angle of the work machine;

determine a second pitch angle based on the first pitch angle;

determine an uphill movement of the work machine and generate a first control signal to retract each of the first actuator and the second actuator for tilting the operator cabin in an anti-clockwise direction based on the uphill movement of the work machine;

determine a downhill movement of the work machine and generate a second control signal to extend the first actuator and retract the second actuator for tilting the operator cabin in a clockwise direction based on the downhill movement of the work machine; and control at least one of the first and second actuators to tilt the operator cabin by the second pitch angle relative to the non-inclined surface, wherein the second pitch angle is opposite in direction to the first pitch angle; and wherein, based on a tilting of the operator cabin relative to the frame structure, a plane defined by the operator cabin is substantially parallel to the non-inclined surface.

18. The work machine of claim 17, wherein the tilting mechanism further includes an adjustable linkage assembly, such that the second end of the first actuator is movably coupled to the mounting structure via the adjustable linkage assembly.

19. The work machine of claim 18, wherein the adjustable linkage assembly is an I-shaped adjustable linkage assembly.

* * * * *